June 10, 1930.  A. T. SIMMONS ET AL  1,763,567
AUTOMATICALLY CONTROLLED ICE CREAM FREEZER
Filed May 9, 1928  3 Sheets-Sheet 1
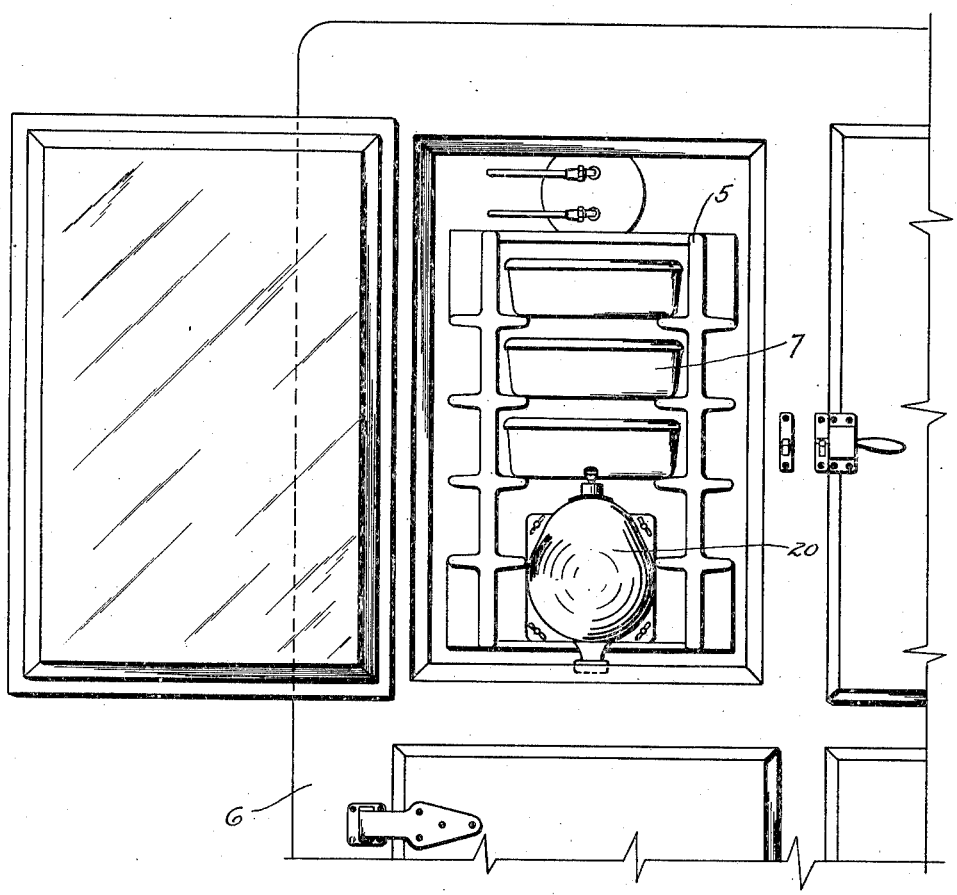
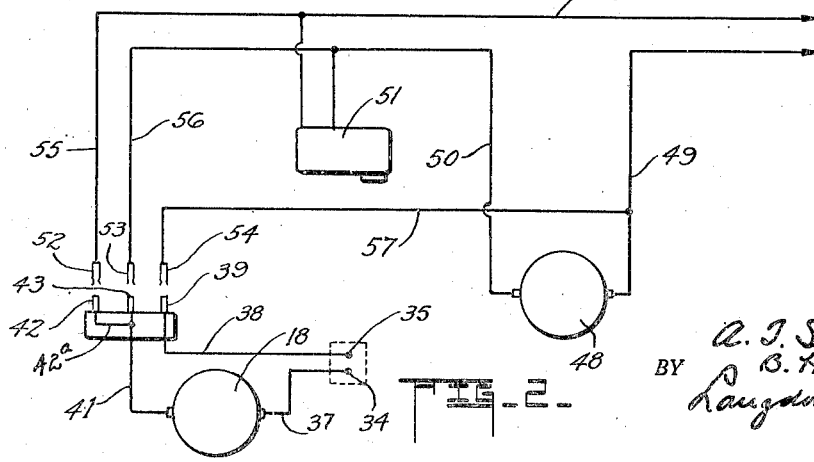
INVENTOR.
A. T. Simmons and
B. H. Mills
BY
Langdon Moon
ATTORNEYS.

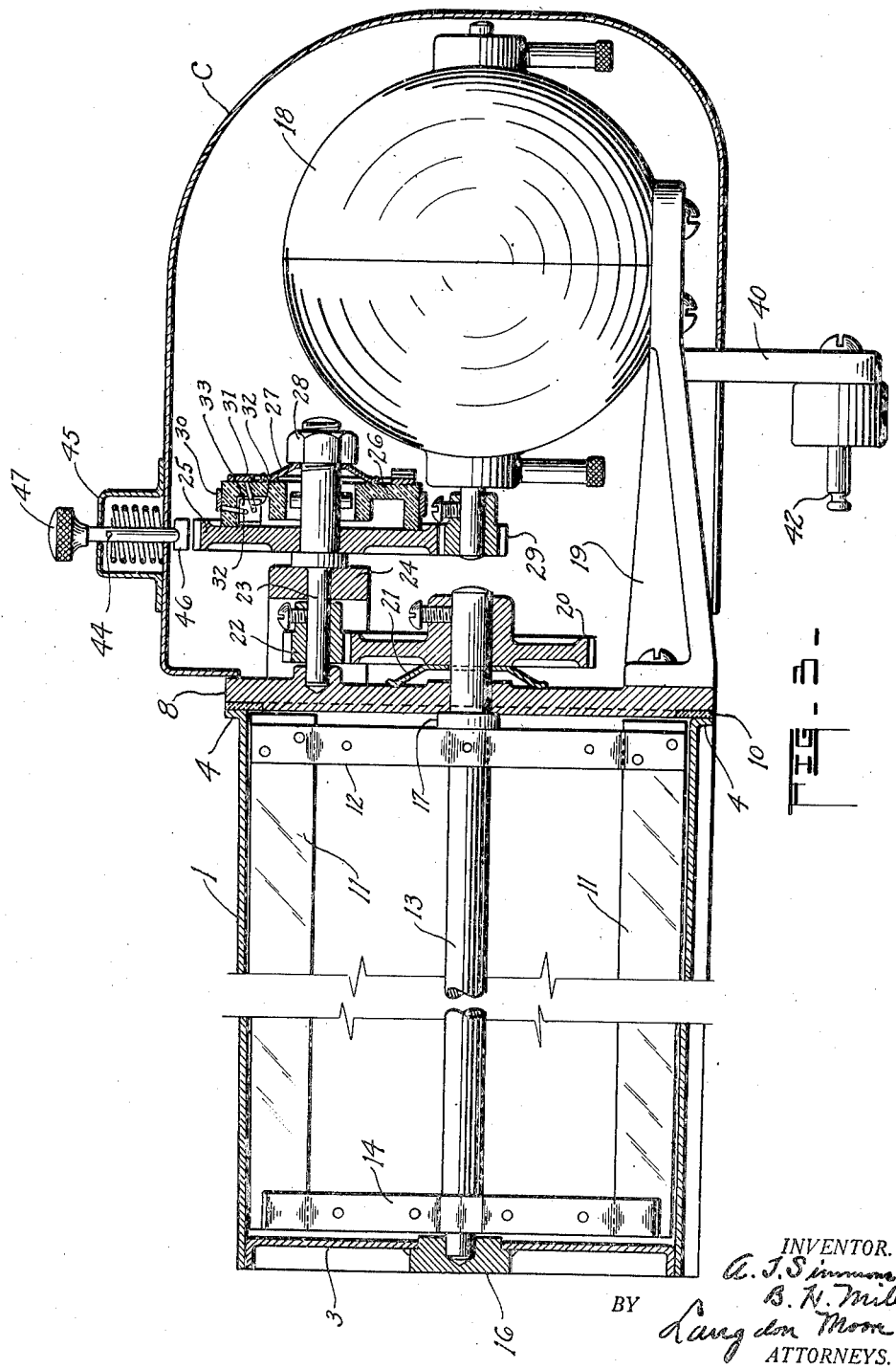

June 10, 1930.    A. T. SIMMONS ET AL    1,763,567
AUTOMATICALLY CONTROLLED ICE CREAM FREEZER
Filed May 9, 1928    3 Sheets-Sheet 3
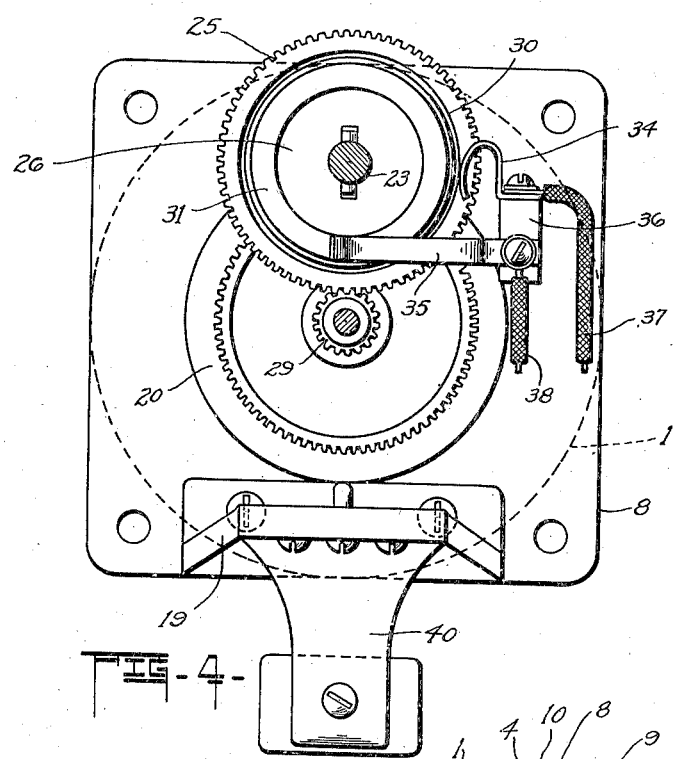
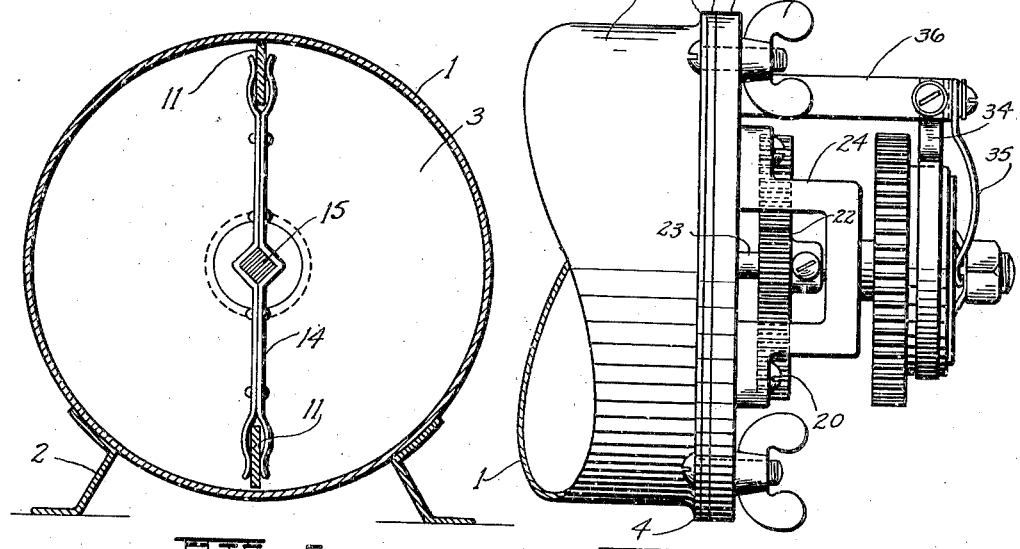
INVENTOR.
A. T. Simmons and
B. W. Miles
BY Langdon Moore
ATTORNEYS.

Patented June 10, 1930

1,763,567

UNITED STATES PATENT OFFICE

AARON T. SIMMONS AND BEVERLY H. MILES, OF BLOOMINGTON, ILLINOIS, ASSIGNORS TO WILLIAMS OIL-O-MATIC HEATING CORPORATION, OF BLOOMINGTON, ILLINOIS, A CORPORATION OF ILLINOIS

AUTOMATICALLY-CONTROLLED ICE-CREAM FREEZER

Application filed May 9, 1928. Serial No. 276,267.

This invention relates to improvements in refrigeration and more particularly to the formation of ice creams and ices for table use in a domestic electrically-operated refrigerating unit.

For years ice creams and ices for table use have been formed by rapidly and continuously beating or agitating the ingredients within a container surrounded by particles of ice, preferably packed with salt to form a refrigerating brine, until the ingredients have sufficiently congealed, then the beaters or agitators are removed, and the cream or ice allowed to remain in the surrounding refrigerant until solidified. This process originally was a manual operation but electric motors have been employed to furnish the power to rotate the agitators.

It is an object of this invention to provide a so-called ice cream freezer to cooperate with an electrically operated domestic refrigerating unit whereby upon insertion of the freezer within the refrigerating compartment, an electric connection is formed between the unit circuit and a motor for operating the freezer which connection is automatically broken when the ingredients in the freezer have been agitated to produce the proper desired consistency. It is another object of this invention to provide agitators of such construction that may be readily removed from the frozen or solidified cream without disrupting the same whereby the necessity of removing the agitators when the agitating ceases is obviated. In the employment of this improved freezer, the housewife merely pours the desired ingredients into the freezer and places the freezer in the refrigerating compartment, then can forget it until the time to serve has arrived.

While a preferred form of this invention is illustrated upon the accompanying sheets of drawings, yet it is understood that minor detail changes may be made without departing from the scope thereof.

In the drawings:

Figure 1 is a fragmentary view in front elevation of an electrically-operated domestic refrigerating unit illustrating the door of the refrigerating compartment open and disclosing this improved freezer in position therein.

Figure 2 is a wiring diagram illustrating the electrical connection established between the unit circuit and freezer circuit when the latter is inserted in proper position within the refrigerating compartment.

Figure 3 is a longitudinal sectional view, with parts broken away illustrating the freezer construction and operating mechanism, partly in section and partly in side elevation.

Figure 4 is a view in end elevation, with the end cover and the motor removed, illustrating the motor shaft and countershaft in section.

Figure 5 is a view in transverse section through the body of the container illustrating the mounting and sliding connection of the agitator arms upon the closed end of the container.

Figure 6 is a top plan fragmentary view of Figure 4 showing the mechanism end of the freezer with the motor support omitted.

The embodiment of this invention as illustrated comprises a cylindrical container 1 increasing slightly in diameter towards the open end, provided with legs 2 adjacent the closed end 3 cooperating with a rectangular flange 4 about the open end to support the freezer upon the bottom of the refrigerating element 5 in the refrigerating compartment of an electrically operated domestic refrigerating unit 6, the freezer being preferably of such size as to be received within the space usually provided for the reception of ice trays 7. A rectangular cover plate 8 is secured to the rectangular flange 4 of the container, preferably by butterfly nuts 9 cooperating with a gasket 10 to form a tight closure therewith. A plurality of agitator arms 11 having outer edges paralleling the interior of the container walls and lower edges paralleling the center line thereof are rigidly mounted upon support 12 non-rotatably carried upon a central shaft 13 adjacent the cover plate 8 and detachably mounted upon a similar support 14 adjacent the closed end 3 of the container, which latter support removably embraces an angular section 15 of the shaft 13. It is preferable to mount this end of the central shaft in a bearing block 16 carried upon the end 3 and extend the shaft through a central bearing in the cover plate 8, and provide the shaft on the inner side thereof with a collar 17 adapted to be drawn thereagainst to form a seal to prevent the escape of the ingredients within the container when in liquid state. The tapered shape of the container and the correspondingly shaped agitator arms detachably supported at their inner ends with the inner support detachably carried upon the central shaft and the outer support rigidly secured thereto to allow the ready withdrawal of the agitator and shaft with the cover plate after the cream or ice has been frozen, the body of which then is readily removed from the container, in the usual way, and the inner support 14 removed from the end of the solidified body.

The mechanism for operating the central or agitating shaft 13 is mounted upon the closure plate 8 and includes a train of gears and an electric motor 18 supported upon a bracket 19 attached to the lower side of said cover plate and extending outward therefrom. It is also preferable to provide a detachable cover C about the operating mechanism of the shape illustrated. The train of gears include a gear wheel 20 adjustably secured to the agitating shaft 13 with a spring washer 21 interposed between the cover plate 8 and inner surface of the hub of said gear wheel 20 whereby sufficient outward tension may be applied to the collar 17 to prevent the liquid contents of the container leaking through the bearing in the cover plate. This gear wheel 20 meshes with a pinion 22 carried on a counter shaft 23 rotatably mounted in bearings upon the cover plate and in a bracket 24 mounted thereon to support the counter shaft parallel to the agitating shaft 13. The counter shaft 23 extends through the bracket 24 and passes through the hub of a gear wheel 25, loosely mounted thereon, and engages a circular clutch 26, of bakelite or other insulating material, having a sliding longitudinal but not rotative movement upon the counter shaft and having an internal flange adapted to frictionally engage the outer surface of the gear wheel 25 in accordance with the tension placed upon a spring washer 27 regulated by a nut 28 upon the screw threaded exterior end of the counter shaft. The gear wheel 25 meshes with a pinion 29 mounted upon the operating shaft of the motor 18. The insulated clutch 26 is provided with a collector ring 30 about its circumference and another collector ring 31 about its outer flat surface adjacent its circumference. Terminals or contacts 32 are extended through the body of the clutch from each collector ring to project within the space at the rear of the clutch and so arranged that both are adapted to simultaneously be engaged or disengaged by a contact block 33 carried upon the outer surface of the gear wheel 25 and extending within the clutch. Collector brushes 34 and 35 are mounted upon a brush post 36 carried upon the cover plate 8 so that brush 34 wipes over collector ring 30 and brush 35 wipes over collector ring 31. The respective collector brushes are connected by flexible leads 37 and 38, one to one pole of the motor 18 and the other to a connection plug 39 extending inward from a plate 40 depending from the motor supporting bracket 19. The other pole of the motor 18 is connected by a flexible lead 41 to two connection plugs 42 and 43 extending the same direction and in the same plane from the plate 40 as plug 39.

When the motor circuit is completed by manual rotation of gear wheel 25 to bring contact block 33 thereon in engagement with contacts 32 and an electrical connection is made by plugs 39, 42 and 43, as hereinafter described, rotation of the motor shaft is transmitted through the train of gears to the agitating shaft. To automatically disconnect the motor when the liquid within the container has been sufficiently agitated to congeal to the desired consistency, the tension of the spring 27 holding the clutch 26 in frictional contact with the gear wheel 25, which normally has been set by the nut 28 to allow a sliding contact upon a predetermined resistance to the rotation of the agitators 11, is overcome by the congealing liquid as it thickens and resists the movement of the agitators until the clutch 26 slides over gear wheel 25 and moves the contact block 33 away from contacts 32, thereby breaking the motor circuit and all motion ceases. After the frozen contents have been removed from the container and it is desired to use the freezer again, it is necessary to rotate the gear wheel in the opposite direction to again close the connection between contacts 32. This is accomplished by mounting a spring pressed pawl shaft 44 in a housing 45 upon the end cover C, which shaft carries on its lower end a pawl 46 adapted upon depression to engage between the teeth of the gear wheel 25 but is normally held out of contact therewith. When desiring to set the automatic mechanism in operative position, the button 47 is depressed to cause the pawl to engage and hold the gear wheel 25 against rotation and then the agitators 11 or agitator shaft 13 is rotated in a counter-clockwise direction until contacts 32 again engage the contact block 33. whereupon the pawl shaft is released and the agitators are ready for insertion into the liquid within the container and the freezer is prepared to be inserted within the refrigerating unit 6.

As heretofore said the refrigerating unit is an electrically operated one. It includes a motor 48, connected by leads 49 and 50 to the commercial line, and a thermostat 51 so connected in the motor circuit to control the operation of the motor to create and maintain a uniform predetermined temperature in the refrigerating compartment. Below the underside of the refrigerating element 5, three sockets 52, 53, and 54 are arranged in line with the plugs 42, 43, and 39 carried upon the plate 40 depending from the motor support of the freezer and are adapted to form an electrical connection therewith when the freezer is inserted in the refrigerating element, as shown in Figure 1. The thermostat 51 is in circuit in the incoming lead 50 before it connected to one pole of the motor and sockets 52 and 53 are connected by leads 55 and 56 in multiple to the incoming lead 50 on opposite sides of the thermostat 51. Socket 54 is connected by lead 57 to the commercial line lead 49 connecting the other pole of the motor 48 to the commercial line. Plugs 42 and 43 are both joined to the motor lead 41 to one pole of the motor 18, so that when the plugs 42, 43 and 39 are received in sockets 52, 53, and 54, the thermostat 51 is shunted out and the motor 48 will continue to operate while the freezer connection remains and the incoming current passes through the freezer motor 18, lead 37 and, if contact block 33 engages contacts 32, then through brushes 34 and 35 to lead 38 and plug 39, hence through socket 54 and lead 57 to lead 49 from opposite pole of the refrigerating unit motor 48 to the commercial line. When the freezer motor circuit is broken through contacts 32, the unit thermostat is again in circuit with the unit motor 48. Plugs 42 and 43 are connected by lead 42ª.

From the above it is seen that an automatic electrically operated ice cream freezer has been provided which is adapted to cooperate with an electrically operated domestic refrigerating unit, and which is so constructed that when the desired ingredients have been placed in the freezer and the cover secured thereon, the freezer may be inserted in the refrigerating compartment to make an electrical connection with the refrigerating unit circuit and thereafter the door to the refrigerating compartment may be closed and not opened again until it is desired to serve the cream. The establishing of the connection from the unit motor circuit to the freezer motor circuit not only starts the freezer agitator arm to start beating but also cuts out the unit thermostat, then as soon as the ingredients have congealed to the desired consistency, the freezer motor is automatically cut out and the unit thermostat cut in to thereafter normally control the unit motor.

The only personal attention required in using this improved freezer is the preparation of the desired ingredients for the cream or ice to be frozen, placing such ingredients within the freezer and inserting the freezer in the refrigerating unit, and closing the door thereon.

We claim:

1. The combination with an electrically operated domestic refrigerating unit, including an electric circuit and a thermostat in said circuit to control the operation of the unit motor to maintain a predetermined temperature within the unit, of an electrically operated ice cream freezer, and means adapted to connect the electric circuit of the freezer upon the insertion of the freezer within the unit.

2. The combination with an electrically operated domestic refrigerating unit, including an electric circuit and a thermostat therein to control the operation thereof to maintain a predetermined temperature within the unit, of an electrically operated ice cream freezer, and means adapted to connect the respective electric circuits to each other upon the insertion of the freezer within the unit, and temporarily shunts out the thermostat from the unit circuit.

3. The combination with an electrically operated domestic refrigerating unit, including an electric circuit and a thermostat therein to control the operation thereof to maintain a predetermined temperature within the unit, of an electrically operated ice cream freezer, and means adapted to connect the respective electric circuits to each other upon the insertion of the freezer within the unit, and temporarily shunts out the thermostat from the unit circuit, said electrically operated freezer having means acting when its contents congeal to a predetermined consistency to discontinue its operation.

4. The combination with an electrically operated domestic refrigerating unit, including an electric circuit and a thermostat therein to control the operation thereof to maintain a predetermined temperature within the unit, of an electrically operated ice cream freezer, and means adapted to connect the respective electric circuits to each other upon the insertion of the freezer within the unit, and temporarily shunts out the thermostat from the unit circuit, said electrically operated freezer having means acting when its contents congeal to a predetermined consistency to discontinue its operation, and thereupon restore the thermostat connection to the refrigerating unit circuit.

5. The combination with an electrically operated refrigerating unit including a motor for circulating the refrigerating medium, of an electrically operated ice cream freezer including a motor and a container for the ingredients to be frozen having rotatable agitators having an operative connection including a frictional clutch to the freezer motor, and means upon the freezer adapted upon insertion within the unit to connect the motor circuit of the freezer to the circuit supplying the motor of the unit.

6. The combination with an electrically operated refrigerating unit including a motor for circulating the refrigerating medium, of an electrically operated ice cream freezer including a motor and a container for the ingredients to be frozen having rotatable agitators having an operative connection including a frictional clutch to the freezer motor, and means upon the freezer adapted upon insertion within the unit to connect the motor circuit of the freezer to the circuit supplying the motor of the unit, said friction clutch, when the resistance to the rotation of the agitators becomes greater than the friction thereof, adapted to cause the freezer motor circuit to be broken.

Signed at Bloomington, Illinois, May 3, 1928.

AARON T. SIMMONS.
BEVERLY H. MILES.